United States Patent
Suzuki

(10) Patent No.: US 8,675,034 B2
(45) Date of Patent: Mar. 18, 2014

(54) OPTICAL SCANNING APPARATUS AND IMAGE FORMING APPARATUS

(75) Inventor: Seizo Suzuki, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 5 days.

(21) Appl. No.: 13/339,858

(22) Filed: Dec. 29, 2011

(65) Prior Publication Data

US 2012/0176462 A1 Jul. 12, 2012

(30) Foreign Application Priority Data

Jan. 6, 2011 (JP) .................................. 2011-001131

(51) Int. Cl.
*B41J 2/385* (2006.01)
*B41J 27/00* (2006.01)
*G02B 13/08* (2006.01)

(52) U.S. Cl.
USPC ............ 347/244; 347/134; 347/137; 347/241; 347/243; 347/256; 347/258; 347/259; 359/668

(58) Field of Classification Search
None
See application file for complete search history.

(56) References Cited

U.S. PATENT DOCUMENTS

| | | |
|---|---|---|
| 4,995,710 A | 2/1991 | Suzuki et al. |
| 5,005,928 A | 4/1991 | Suzuki et al. |
| 5,355,244 A | 10/1994 | Suzuki et al. |
| 5,546,216 A | 8/1996 | Suzuki |
| 5,606,181 A | 2/1997 | Sakuma et al. |
| 5,875,051 A | 2/1999 | Suzuki et al. |
| 6,069,724 A | 5/2000 | Hayashi et al. |
| 6,081,386 A | 6/2000 | Hayashi et al. |
| 6,104,522 A | 8/2000 | Hayashi et al. |
| 6,233,081 B1 | 5/2001 | Suzuki et al. |
| 6,256,133 B1 | 7/2001 | Suzuki et al. |
| 6,330,017 B1 | 12/2001 | Suzuki |
| 6,347,004 B1 | 2/2002 | Suzuki et al. |
| 6,384,949 B1 | 5/2002 | Suzuki |
| 6,388,792 B1 | 5/2002 | Atsuumi et al. |
| 6,400,391 B1 | 6/2002 | Suhara et al. |
| 6,417,509 B1 | 7/2002 | Atsuumi et al. |
| 6,448,998 B1 | 9/2002 | Suzuki et al. |
| 6,509,995 B1 | 1/2003 | Suzuki et al. |
| 6,596,985 B2 | 7/2003 | Sakai et al. |
| 6,657,761 B2 | 12/2003 | Suzuki et al. |

(Continued)

FOREIGN PATENT DOCUMENTS

| | | |
|---|---|---|
| JP | 4-101112 | 4/1992 |
| JP | 8-15625 | 1/1996 |
| JP | 2008-76712 | 4/2008 |

*Primary Examiner* — Matthew Luu
*Assistant Examiner* — Kendrick Liu
(74) *Attorney, Agent, or Firm* — Oblon, Spivak, McClelland, Maier & Neustadt, L.L.P.

(57) ABSTRACT

An optical scanning apparatus and an image forming apparatus having the optical scanning apparatus includes a before-light-deflecting-unit optical system and a scanning optical system. The optical system includes a first optical device, a second optical device made of a resin material which has an anamorphic negative refracting power in a deflection scanning direction and a deflection scan perpendicular direction and has a larger refracting power in the deflection scan perpendicular direction than a refracting power in the deflection scanning direction, and a third optical device made of a glass material which has substantially no refracting power in the deflection scanning direction and a positive refracting power in the deflection scan perpendicular direction. An interval of the scanning lines formed on the scanned surface is adjusted by displacement of the second and third optical devices in an optical axis direction of the before-light-deflecting-unit optical system.

12 Claims, 9 Drawing Sheets

(56) References Cited

U.S. PATENT DOCUMENTS

| | | |
|---|---|---|
| 6,771,407 B2 | 8/2004 | Hayashi et al. |
| 6,781,729 B2 | 8/2004 | Suzuki et al. |
| 6,785,028 B1 | 8/2004 | Atsuumi et al. |
| 6,788,444 B2 | 9/2004 | Suzuki et al. |
| 6,791,729 B2 | 9/2004 | Atsuumi et al. |
| 6,813,051 B2 | 11/2004 | Suzuki et al. |
| 6,829,104 B2 | 12/2004 | Suzuki et al. |
| 6,833,940 B2 | 12/2004 | Suzuki et al. |
| 6,906,739 B2 | 6/2005 | Suzuki et al. |
| 6,999,208 B2 | 2/2006 | Suzuki et al. |
| 7,006,120 B2 | 2/2006 | Sakai et al. |
| 7,038,822 B2 | 5/2006 | Sakai et al. |
| 7,045,773 B2 | 5/2006 | Suzuki et al. |
| 7,050,082 B2 | 5/2006 | Suzuki et al. |
| 7,061,658 B2 | 6/2006 | Suzuki |
| 7,088,485 B2 | 8/2006 | Suzuki |
| 7,167,288 B2 | 1/2007 | Miyatake et al. |
| 7,215,354 B1 | 5/2007 | Sakai et al. |
| 7,256,815 B2 | 8/2007 | Suzuki et al. |
| 7,277,212 B2 | 10/2007 | Miyatake et al. |
| 7,333,254 B2 | 2/2008 | Amada et al. |
| 7,403,316 B2 | 7/2008 | Amada |
| 7,450,274 B2 | 11/2008 | Itabashi et al. |
| 7,532,227 B2 | 5/2009 | Nakajima et al. |
| 7,760,223 B2 | 7/2010 | Suzuki et al. |
| 7,764,301 B2 | 7/2010 | Suzuki et al. |
| 7,903,135 B2 | 3/2011 | Ichii et al. |
| 8,072,478 B2 | 12/2011 | Tanabe et al. |
| 2002/0105707 A1* | 8/2002 | Hayashi ............... 359/196 |
| 2005/0225819 A1* | 10/2005 | Atsuumi et al. ......... 359/205 |
| 2007/0279708 A1* | 12/2007 | Yamaguchi ........... 358/484 |
| 2008/0019255 A1 | 1/2008 | Imai et al. |
| 2008/0204841 A1* | 8/2008 | Suzuki et al. ........... 359/204 |
| 2008/0204852 A1 | 8/2008 | Amada et al. |
| 2009/0175657 A1 | 7/2009 | Yoshii et al. |
| 2010/0118366 A1 | 5/2010 | Tokita et al. |
| 2011/0169906 A1 | 7/2011 | Suzuki |

\* cited by examiner

CROSS SECTION IN DEFLECTION SCANNING DIRECTION

CROSS SECTION IN DEFLECTION SCANNING PERPENDICULAR DIRECTION

FIG.9

| NAME | SHAPE | MATERIAL | MAIN CURVATURE RADIUS | SUB CURVATURE RADIUS | PLANE INTERVAL | FOCAL LENGTH | COMPOSITE FOCAL LENGTH |
|---|---|---|---|---|---|---|---|
| COUPLING LENS (FIRST OPTICAL DEVICE) | PLANAR SURFACE | BSC7 | ∞ | ∞ | 5.000 | 41.143 | - |
|  | SPHERICAL SURFACE |  | -21.030 | -21.030 | - |  |  |

| NAME | SHAPE | MATERIAL | MAIN CURVATURE RADIUS | SUB CURVATURE RADIUS | PLANE INTERVAL | FOCAL LENGTH | COMPOSITE FOCAL LENGTH |
|---|---|---|---|---|---|---|---|
| ANAMORPHIC LENS (SECOND OPTICAL DEVICE) | ANAMORPHIC SURFACE | CYCLIC POLYOLEFIN | -145.800 | -24.100 | 3.000 | fs=-45.999 fm=-278.285 | fs=48.873 fsb=58.542 fm=-278.285 |
|  | PLANAR SURFACE |  | ∞ | ∞ | 7.000 |  |  |
| CYLINDRICAL LENS (THIRD OPTICAL DEVICE) | CYLINDRICAL SURFACE | BSC7 | ∞ | 15.000 | 5.000 | fs=29.346 fm=∞ |  |
|  | PLANAR SURFACE |  | ∞ | ∞ | - |  |  |

FIG.10

| | L1 | | L2 | |
|---|---|---|---|---|
| | Sur.1 | Sur.2 | Sur.1 | Sur.2 |
| Rm0 | −125.930 | −60.678 | −10000 | 520.144 |
| a00 | 0.00000E+00 | 0.00000E+00 | 0.00000E+00 | 0.00000E+00 |
| a04 | 6.91397E−07 | 7.94205E−07 | 3.29667E−07 | 1.27206E−07 |
| a06 | −1.17421E−10 | 8.10435E−11 | −7.12268E−11 | −4.62723E−11 |
| a08 | −7.59529E−14 | −4.46442E−14 | 6.28263E−15 | 4.04792E−15 |
| a10 | 4.98921E−17 | 6.78493E−18 | −2.72118E−19 | −1.65776E−19 |
| a12 | −7.99430E−21 | 4.18587E−21 | 4.69377E−24 | 2.58917E−24 |
| | | | | |
| Rs0 | −500 | −550 | 268.018 | −44.257 |
| b01 | | 9.48903E−06 | 1.92169E−06 | |
| b02 | | −4.04246E−06 | −9.73515E−07 | 3.26958E−07 |
| b03 | | 7.83108E−09 | 2.78624E−10 | |
| b04 | | −2.32948E−09 | 7.99963E−11 | |
| b05 | | −1.27532E−11 | −8.27927E−14 | |
| b06 | | 1.22637E−12 | 1.16623E−14 | |
| b07 | | 2.55440E−15 | 8.54769E−18 | |
| b08 | | 4.46134E−16 | −1.73644E−18 | |
| b09 | | 6.68092E−19 | −3.04034E−22 | |
| b10 | | −1.67752E−19 | 6.41013E−23 | |

| | | | | | | |
|---|---|---|---|---|---|---|
| BEFORE CORRECTION | MAIN-SCAN WAIST POSITION [mm] | -1 | 0 | -1 | -1 | -1 |
| | SUB-SCAN WAIST POSITION [mm] | 0 | 0 | 0 | 0 | 0 |
| | BEAM PITCH [μm] | 0 | 10 | 10 | -10 | -10 |

| | | | | | | |
|---|---|---|---|---|---|---|
| CORRECTION AMOUNT | MOVING AMOUNT OF SECOND OPTICAL DEVICE [mm] | 1.34 | 0.00 | 1.34 | -1.34 | 1.34 |
| | MOVING AMOUNT OF THIRD OPTICAL DEVICE [mm] | 1.91 | -1.03 | 0.87 | -0.87 | 2.94 |

| | | | | | | |
|---|---|---|---|---|---|---|
| AFTER CORRECTION | MAIN-SCAN WAIST POSITION [mm] | 0.00 | 0.00 | 0.00 | 0.00 | 0.00 |
| | SUB-SCAN WAIST POSITION [mm] | -0.34 | -0.28 | -0.62 | 0.62 | -0.06 |
| | BEAM PITCH [μm] | 0.00 | 0.00 | 0.00 | 0.00 | 0.00 |

FIG.12

| | LINEAR EXPANSION COEFFICIENT | Δn/°C | Δn/Δλ | Δλ/°C |
|---|---|---|---|---|
| CYCLIC POLYOLEFIN RESIN | 7.0000E-05 | -7.5000E-05 | -2.6392E-05 | |
| GLASS (BSC7) | 7.6000E-06 | 2.7000E-06 | -2.3674E-05 | |
| ALUMINUM | 2.3500E-05 | - | - | |
| LIGHT SOURCE | - | - | - | 6.0000E-02 |

CENTRAL WAVELENGTH OF LIGHT SOURCE: 782 nm

FIG.13

| | CHANGE IN MAIN-SCAN BEAM WAIST POSITION [mm] | CHANGE IN SUB-SCAN BEAM WAIST POSITION [mm] | CHANGE IN BEAM PITCH [μm] |
|---|---|---|---|
| ABSENCE OF TEMPERATURE CORRECTION | 1.25 | 1.50 | 1.30 |
| PRESENCE OF TEMPERATURE CORRECTION | 0.14 | 1.06 | 0.74 |

OPTICAL SCANNING APPARATUS AND IMAGE FORMING APPARATUS

CROSS-REFERENCE TO RELATED APPLICATIONS

The present application claims priority to and incorporates by reference the entire contents of Japanese Patent Application No. 2011-001131 filed in Japan on Jan. 6, 2011.

BACKGROUND OF THE INVENTION

1. Field of the Invention

The present invention relates to an optical scanning apparatus, and an image forming apparatus such as a copying machine, a facsimile, a printer or a multifunctional machine having functions thereof, which are equipped with the optical scanning apparatus.

2. Description of the Related Art

In an image forming apparatus including a copying machine, a facsimile, a laser printer, or a multifunctional machine, there is an increasing tendency in the number of scanning beams used for a scanning optical system to meet demands for high speed, high resolution, and wide writing width of the apparatus. A color image forming apparatus including a plurality of optical scanning apparatuses using multiple beams has also been commonly used.

As a light source for multiple beams installed in the optical scanning apparatus, there are known a semiconductor laser array (hereinafter, referred to as an "LD array") in which light emitting points are arrayed one-dimensionally at predetermined intervals, a vertical cavity surface emitting laser array (hereinafter, referred to as a "VCSEL") in which light emitting points are arrayed two-dimensionally at predetermined intervals, etc. Among them, for the former laser array, also use is made of a system in which light fluxes emitted from a plurality of LD arrays are combined using a beam combining prism or the like to increase the number of beams, and this system may be considered to use a light source in which light emitting points are arrayed two-dimensionally as with the latter VCSEL.

On the other hand, in general, as the number of beams of the light source is increased, an allowable level of a scanning line interval error or scanning line interval deviation between scanning positions of scanning lines formed on the scanned surface becomes severer. If the error or deviation increases, then periodic streak and/or contrasting density unevenness or irregularity (referred to as banding) is easily perceptible to the eye in a periodic image such as a horizontal line image or a halftone image, thereby leading to the cause of deterioration in image quality. In addition, in the color image forming apparatus, if so, it may lead to the cause of color deviation (registration shift) of the colors, so that image quality deteriorates.

To this end, for instance, Japanese Patent Application Laid-open No. H4-101112, Japanese Patent Application Laid-open No. H8-015625, and Japanese Patent Application Laid-open No. 2008-076712, there have been proposed adjusting means capable of maintaining good beam pitch and beam diameter that are formed on a photosensitive material serving as a scanned surface, through the movement in an optical axis direction or the rotation around the optical axis of a cylinder lens, so as to make a scanning line interval (beam pitch) formed on the optical scanned surface to be a target interval.

Generally, in a multibeam optical system, since an interval of the beams situated on an image plane can be narrowed by decreasing the arrangement interval of the light sources, the multibeam optical system is suitable for high-density writing. However, in reality, as the intervals of the light sources are decreased, the optical system's lifetime is more shortened due to heat generation, and the optical system is more vulnerable to thermal and electrical crosstalk. For this reason, there is a limitation in decreasing the intervals of the light sources.

With respect to adjusting means for maintaining an appropriate beam interval and an appropriate beam diameter, Japanese Patent Application Laid-open No. H4-101112, Japanese Patent Application Laid-open No. H8-015625, and Japanese Patent Application Laid-open No. 2008-076712 do not have any disclosure of adjustment to the influence of change in temperature.

SUMMARY OF THE INVENTION

It is an object of the present invention to at least partially solve the problems in the conventional technology.

The present invention provides an optical scanning apparatus including:

a light source that has a plurality of light emitting points;

a light deflecting unit that deflects a plurality of light fluxes emitted from the light source for scanning;

a before-light-deflecting-unit optical system that shapes the plurality of light fluxes emitted from the light source to form a linear image which is elongated in a deflection scanning direction at an approximate position of a deflecting surface of the light deflecting unit; and a scanning optical system that forms an image on a scanned surface from the light fluxes deflected for the scanning in the deflecting surface of the light deflecting unit, wherein the before-light-deflecting-unit optical system includes: a first optical device which shapes the plurality of light fluxes emitted from the light source; a second optical device made of a resin material which has an anamorphic negative refracting power in a deflection scanning direction and a deflection scan perpendicular direction and has a larger refracting power in the deflection scan perpendicular direction than a refracting power in the deflection scanning direction; and a third optical device made of a glass material which has substantially no refracting power in the deflection scanning direction and a positive refracting power in the deflection scan perpendicular direction, the optical devices being disposed in this order from the light source side, and wherein an interval of the scanning lines formed on the scanned surface is adjusted by displacement of the second optical device and the third optical device in an optical axis direction of the before-light-deflecting-unit optical system.

The present invention also provides an image forming apparatus including:

a developing unit including a photosensitive material, a charging unit that electrically charges a surface of the photosensitive material, an optical scanning unit that illuminates the surface of the photosensitive material charged by the charging unit with light to form an electrostatic latent image, and a developing device that attaches toner to the electrostatic latent image on the photosensitive material to form a toner image;

a transferring unit that transfers the toner image formed on the photosensitive material onto a recording medium; and a fixing unit that fixes the toner image on the recording medium, wherein the above-mentioned optical scanning apparatus is provided as the optical scanning unit.

The present invention further provides an image forming apparatus including:

a plurality of developing units each including a photosensitive material, a charging unit that electrically charges a surface of the photosensitive material, an optical scanning unit that illuminates the surface of the photosensitive material charged by the charging unit with light to form an electrostatic latent image, and a developing device that attaches toner to the electrostatic latent image on the photosensitive material to form a toner image;

a transferring unit that transfers the toner image formed on the photosensitive material onto a recording medium; and a fixing unit that fixes the toner image on the recording medium, wherein the above-mentioned optical scanning apparatus is provided as the optical scanning unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a table listing lens data of optical devices of the before-light-deflecting-unit optical system in the optical scanning apparatus according to the present invention;

FIG. 10 is a table listing lens data of scanning lenses L1 and L2 of the scanning optical system;

FIG. 12 is a table listing data of linear expansion coefficients and data of temperature dependency and wavelength dependency of refractive indexes; and FIG. 13 is a table listing changes in characteristic values in the case where a temperature of an LSU is changed by 25° C.

DETAILED DESCRIPTION OF THE PREFERRED EMBODIMENTS

Hereinafter, an optical scanning apparatus and an image forming apparatus according to the present invention will be described with reference to the drawings. In addition, the present invention is not limited to embodiments described hereinafter, but addition, change, removal, and the like for other embodiments may be made within the scope contrived by an ordinarily skilled person, and as long as an embodiment provides the functions and effects of the present invention, the embodiment is included within the scope of the present invention.

Figure 1:
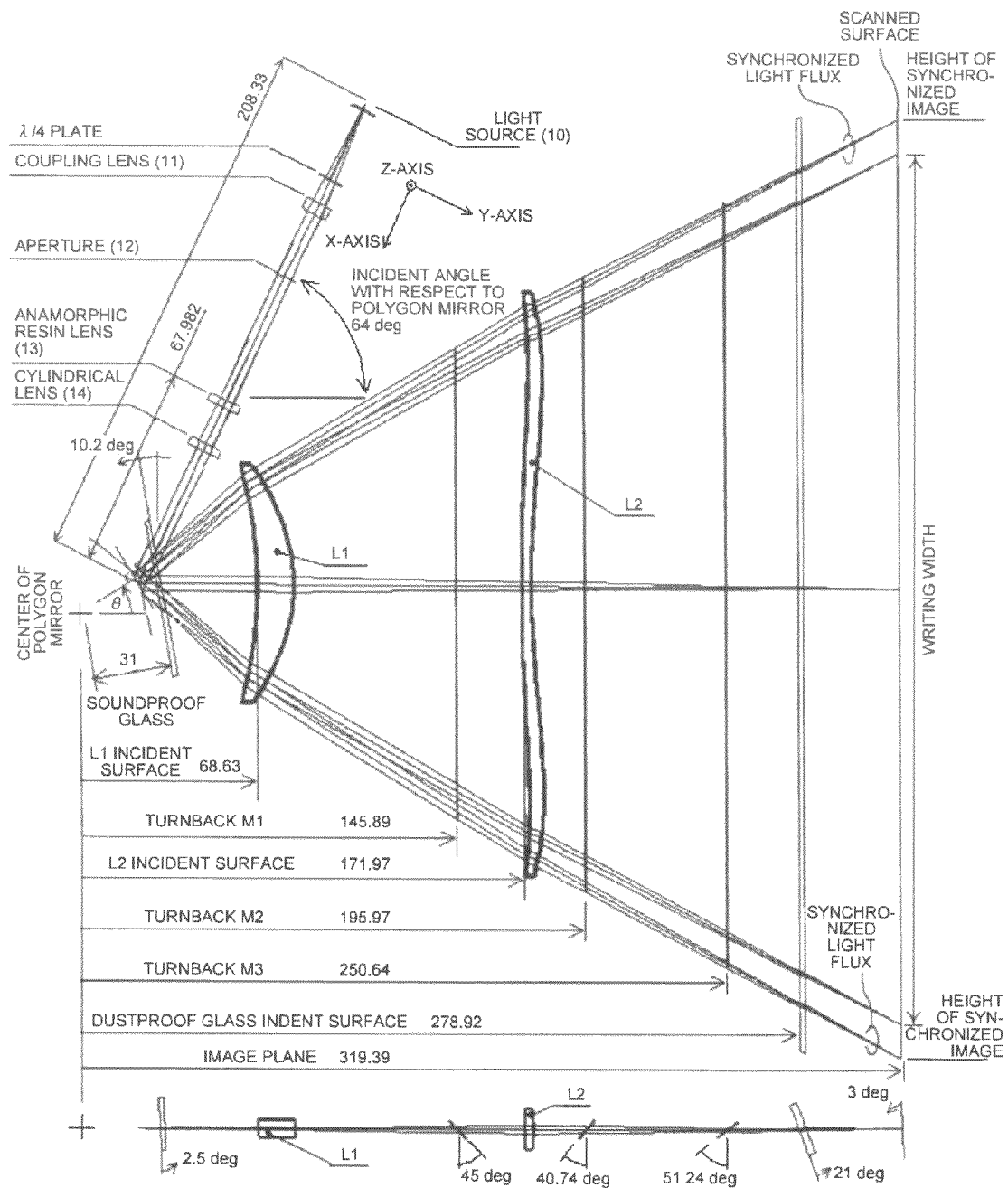
FIG. 1 is a schematic diagram illustrating an overall configuration from a light source of an optical system in an optical scanning apparatus to a scanned surface, according to the present invention.

FIG. 1 is a schematic diagram illustrating an overall configuration of an optical system in an optical scanning apparatus according to the present invention from a light source to a scanned surface.

The optical scanning apparatus according to the present invention includes: a light source 10 having a plurality of light emitting points; a light deflecting unit which deflects a plurality of light fluxes emitted from the light source 10 to perform scanning; a before-light-deflecting-unit optical system which shapes the plurality of light fluxes emitted from the light source 10 and forms a long line image extending in a deflection scanning direction at substantially a deflecting surface position of the light deflecting unit; and a scanning optical system which forms an image on the scanned surface from the light fluxes deflected for the scanning with a deflecting surface of the light deflecting unit.

The before-light-deflecting-unit optical system includes a coupling lens 11 as a first optical device, an anamorphic resin lens 13 as a second optical device, and a cylindrical glass lens 14 as a third optical device in the order from the light source 10 side. An example of lens data of the first to third optical devices is shown in FIG. 9, and an example of lens data of scanning lenses L1 and L2 of the scanning optical system is shown in FIG. 10.

There is shown an example of the light source 10 as which a vertical cavity surface emission type laser (hereinafter, referred to as a "VCSEL") is used, serving as a two-dimensional array light source where a plurality of light emitting points are two-dimensionally arrayed. Herein, a wavelength of the light source is 782 nm.

Figure 5:
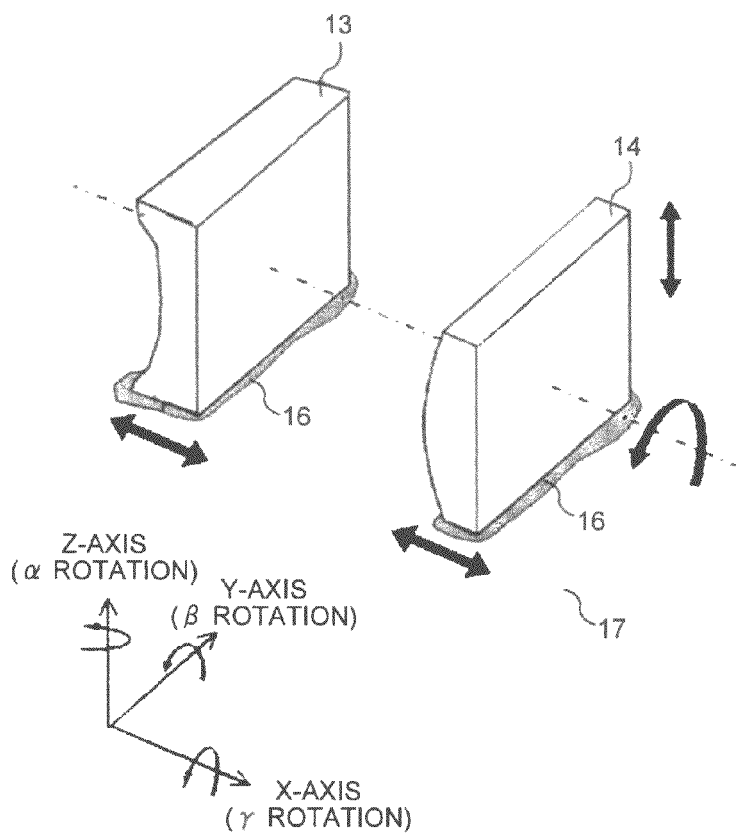
FIG. 5 is a diagram illustrating a method of adjusting and assembling a lens unit in an optical system of the optical scanning apparatus according to the present invention.

It is noted that the light source is not limited to the VCSEL, but as illustrated in FIG. 5, a light source may be used in which light fluxes are emitted from an end-section light emitting type semiconductor laser array (hereinafter, referred to as "LD array") having light emitting points one-dimensionally arrayed and are combined using a beam combining prism or the like. Alternatively, the LD array may be used alone.

In the case of using the two-dimensional array light source such as the VCSEL, rows of light emitting points are adjusted to be in an ideal two-dimensional arrangement by rotating the light source unit around an optical axis.

A polarization of a laser beam emitted from the VCSEL is in a straight line direction, that is a direction parallel to a deflection scan perpendicular direction (hereinafter, sometimes referred to as "sub-scanning direction") which is a direction perpendicular to a direction in which the laser beam is deflected for the scanning by the light deflecting unit described later. 40 beams are emitted from the VCSEL of the light source, in which an interval in a sub-scanning direction between scanning lines which are farthermost away from each other on the scanned surface is about 0.4 mm.

Figure 2:
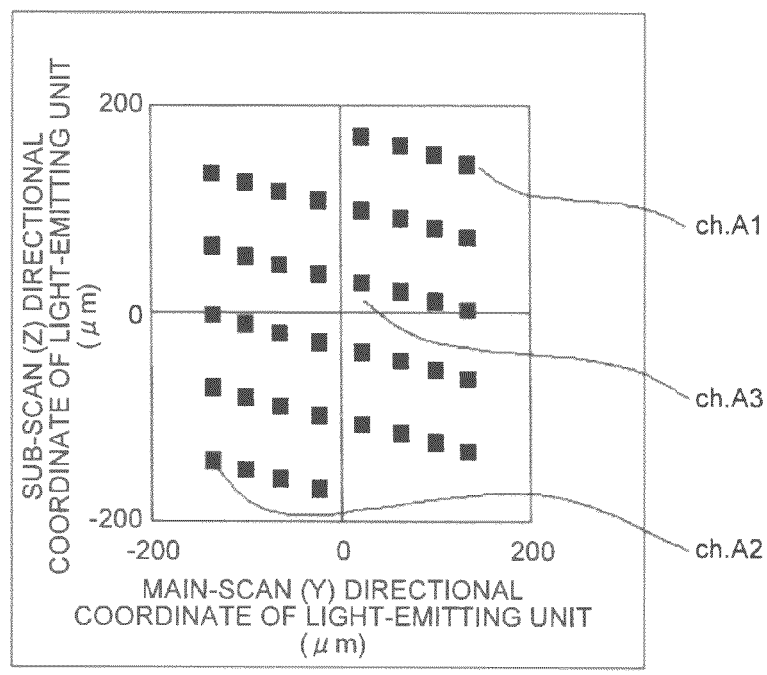
FIG. 2 is a diagram illustrating a light emitting point array of a surface emitting laser.

FIG. 2 is a diagram illustrating a light emitting point array of the VCSEL. The VCSEL is a monolithic laser array device.

A λ/4 plate converts a linearly-polarized light flux from the light source into circularly-polarized light.

The coupling lens 11 made of a glass material as the first optical device converts light fluxes from the light source into approximately parallel light. An aperture has a function of shaping the parallel light and setting a beam spot diameter.

A lens group is configured sequentially from the light source 10 side to include an anamorphic resin lens 13 which is a second optical device having an anamorphic negative refracting power in the deflection scan direction (main-scanning direction) and the deflection scan perpendicular direction (sub-scanning direction) and a cylindrical lens 14 which is a third optical device having a positive refracting power only in the deflection scan perpendicular direction (sub-scanning direction).

The interval of the scanning lines formed on the scanned surface is adjusted by displacing the second optical device 13 and the third optical device 14 constituting the lens group in the optical axis direction, so that the interval can reach a desired value and the beam spot diameter on the scanned surface can be appropriately corrected. Therefore, particularly, it is possible to suppress the occurrence of image density unevenness (so-called banding) which is a problem in multi-beam systems. A method of the displacement will be described later.

Furthermore, the second optical device 13 is made of a resin material and the third optical device 14 is made of a glass material, so that it is possible to correct change in a focus position caused by change in an ambient temperature of an LSU (Laser Scanning Unit). In addition, in the case where change in temperature occurs, change in a beam waist position can be effectively reduced, so that it is possible to suppress variation in the beam spot diameter.

In this manner, with the configuration of the present invention, a beam pitch adjustment function and a temperature correction function can be integrated in two optical devices, i.e., the second optical device and the third optical device.

The shapes of the second optical device 13 and the third optical device 14 and the arrangement relation therebetween are illustrated in detail in FIGS. 3, 4A, 4B and 5.

For adjustment of the beam spot diameter and the beam pitch, the second optical device 13 and the third optical device 14 are adjusted in the optical axis direction (X-axis direction of a coordinate system illustrated in FIG. 5) of the before-light-deflecting-unit optical system, the optical axis perpendicular direction (Z-axis direction of the same), and the optical axis circumferential direction (Z axis rotational direction in the figure) and, after that, the optical devices are fixed to an optical housing unit 17.

A method of fixing the second optical device 13 and the third optical device 14 includes an adhering method using an adhering member 16 such as a UV curable resin or an adhesive. In addition, with respect to meaning of the "adjustment", if there is no positioning unit for regulating the optical device in the optical axis direction and the housing unit 17 is configured in such a shape that the optical device can be displaced, it may be considered that the adjustment has been done in a substantial way.

In addition, each of the second optical device 13 and the third optical device 14 is configured so that a curved surface thereof is disposed on their incidence surface side of the light from the light source 10. According to this arrangement, since reflected returning light from the incidence surface to the light source 10 side becomes a diverging light flux in the sub-scanning direction, it is possible to restrain an oscillation state from being unstable even if the reflected light is returned to the VCSEL side.

In the overall configuration illustrated in FIG. 1, a configuration after the before-light-deflecting-unit optical system is as follows.

A soundproof glass material is disposed at a position away by 31 mm from a rotational center of a polygon mirror with an angle of 10.2 degrees with respect to the main-scanning direction and an angle of 2.5 degrees with respect to the sub-scanning direction. The light flux from the light source 10 is incident on the polygon mirror with an angle of 64 degrees with respect to the normal line to the scanned surface and deflected by the polygon mirror having a radius of an inscribed circle of 25 mm and the number of deflection-reflecting surfaces of 6 to form an image of the scanned surface in a constant velocity manner by the scanning lenses L1 and L2.

A shape of each surface of the scanning lenses is expressed by the following Equations (3) and (4), and coefficients thereof are listed in a table of FIG. 10.

In addition, in the following Equations (3) and (4), X is the optical axis direction (light flux emitting direction), Y is the main-scanning direction, $C_{m0}=1/R_{m0}$ is the main-scanning direction curvature, and $C_s(Y)$ is the sub-scanning direction curvature in Y.

$$X(Y) = \frac{C_{m0} \cdot Y^2}{1 + \sqrt{1 - (1+a_{00}) \cdot C_{m0}^2 \cdot Y^2}} + \quad (3)$$
$$a_{01} \cdot Y + a_{02} \cdot Y^2 + a_{03} \cdot Y^3 + a_{04} \cdot Y^4 + \ldots$$

$$C_S(Y) = \frac{1}{R_{50}} + b_{01} \cdot Y + b_{02} \cdot Y^2 + b_{03} \cdot Y^3 + \ldots \quad (4)$$

In FIG. 1, with respect to the scanned surface, the normal line to the surface is tilted by 3 degrees in the sub-scanning cross section, thereby preventing regularly reflected light from the scanned surface from causing any problem.

A range of the scanned surface indicated by "writing width" is a range where image information is written when the light reaches the photosensitive material which serves as the scanned surface. At a height of an image indicated by "height of a synchronized image", the light does not actually reach the photosensitive material, and a signal is detected by a synchronization sensing unit (not shown) and used for determining write timing.

By performing detection on both a writing start side and a writing end side, so that a temporal change such as temperature influence can be detected in order that a feedback correction can be performed.

The writing width is 328 mm, and a distance between the heights of the synchronized images is 354 mm.

Next, a method of adjusting the second optical device 13 and the third optical device 14 will be described.

In the sub-scanning direction of the optical scanning apparatus according to the present invention, where the focal length of the first optical device 11, a composite focal length of the second optical device 13 and the third optical device 14 in the deflection scan perpendicular direction, and a lateral magnification ratio of the scanning optical system in the deflection scan perpendicular direction are denoted by fc, fcy, and βs, respectively, a total magnification ratio of a whole of the optical system in the sub-scanning direction is expressed by |βs×fcy/fc|.

In this case, if lenses or the like has some component manufacturing error or component arrangement error, then the total magnification ratio of the optical system in the sub-scanning direction is changed, thereby leading to the cause of an error in the scanning line interval on the scanned surface or an error in the image plane in the sub-scanning direction position. In the multibeam scanning apparatus, as the number of scanning beams is increased, the allowable scanning line interval error becomes stricter, so that a finely adjusting unit for a scanning line interval is essential.

Then, in the present invention, it is intended to divide a single cylindrical lens in the conventional art, and to configure a lens group including an anamorphic resin lens (second optical device) 13 having a negative refracting power in both of the main-scanning direction and the sub-scanning direction and a cylindrical lens (third optical device) 14 having a positive refracting power only in the sub-scanning direction. On that basis, the interval between the lenses is adjusted by displacing the two lenses in the optical axis direction so as to change the value of fcy, and adjust the total magnification ratio in the sub-scanning direction, thereby performing adjustment of making the beam pitch to approach a desired value.

A table of FIG. 9 shows one example (an ideal case at the central value) of lens data of the coupling lens (first optical device) 11, the anamorphic resin lens (second optical device) 13, and the cylindrical lens (third optical device) 14 that constitute a before-light-polarizing-unit optical system.

In the before-light-polarizing-unit optical system, a zoom lens part is composed of the anamorphic resin lens (second optical device) 13 and the cylindrical lens (third optical device) 14. By correcting a difference between beam waist positions in the main-scanning direction and the sub-scanning direction and a shift of the magnification ratio of a whole of the optical system in sub-scanning direction, which are caused by the component manufacturing error and/or the component arrangement error in the lenses or the like, an adjustment is performed to obtain a good beam spot diameter and a good beam pitch.

In the configuration of the present invention, since the anamorphic resin lens (second optical device) 13 has negative power in both the main-scanning direction and the sub-scanning direction, both of the beam waist positions and the optical magnification ratios in the main-scanning direction and the sub-scanning direction are changed according to the movement in the X-axis direction. On the other hand, since the cylindrical lens (third optical device) 14 has a refracting power in only the sub-scanning direction, the beam waist position in main-scanning direction is not changed.

Therefore, the adjustment can be performed according to the following procedure.

First, the beam waist position in the main-scanning direction is corrected by shifting the anamorphic resin lens (second optical device) 13 in the X-axis direction. It may be adjusted to the position where the diameter of the main-scanning beam spot is smallest on the image plane using a beam spot diameter measuring machine or the like, or the adjustment may be performed using a double knife edge so that the beam waist position is directly coincident with an image plane.

Next, the deviation in the beam pitch is corrected by shifting the cylindrical lens (third optical device) 14 in the X-axis direction and changing the total magnification ratio of the optical system. A deviation in the total magnification ratio of the optical system is adjusted and corrected so that the beam pitch becomes a desired interval by means of measuring intervals between a plurality of beams on the image plane using a sensor such as a CCD, or by something like that.

In addition, in one embodiment, the beam waist position in the sub-scanning direction is not actively corrected and adjusted, but the optical magnification ratio in the sub-scanning direction is mainly adjusted, so that the beam waist position in the sub-scanning direction may accordingly reach a desired position (in comparison with the state where the adjustment is not performed) to some degree.

Figure 11:
FIG. 11 is a table listing changes in beam waist position and in beam pitch before and after correction of a second optical device and a third optical device.

FIG. 11 illustrates an effect of the correction of the beam waist position which is obtained through the adjustment described above.

As shown in a table of FIG. 11, for instance, in the case where the main-scanning beam waist is deviated by +1 mm and the beam pitch is deviated by −10 μm, the anamorphic resin lens (second optical device) is shifted by 1.34 mm toward the light source side, and after that, the cylindrical lens (third optical device) is shifted by 0.87 mm toward the light source side, so that it is theoretically possible to correct the main-scanning beam waist position and the beam pitch to be zero.

On the other hand, although the sub-scanning beam waist position is deteriorated toward the image plane side by 0.62 mm, it is at a level where the position is within a depth margin.

In the example illustrated FIG. 11, optical simulation values of the case where the main-scanning beam waist is deviated by +1 mm and the beam pitch is deviated by −10 μm from the central values in the design of the lens are used. However, due to the component manufacturing error and/or the component arrangement error in the lenses or the like, a particular major cause is, in practice, the cause of change in the focal length of the scanning lens, so that the deterioration in the beam pitch and the deterioration of the position deviation of the sub-scanning beam waist are effected in the same direction under normal conditions. Therefore, in the case where the beam pitch is deviated by −10 μm due to change in the focal length of the scanning lens, the position of the sub-scanning beam waist is also simultaneously deviated by about −0.6 mm. For this reason, generally, there are many cases where, when the beam pitch is corrected, the position of the sub-scanning beam waist also concurrently becomes close to the desired position under normal conditions.

In addition, to the aforementioned adjustment, it is also possible to add correction of wavefront aberration by performing rotation adjustment of the second optical device and the third optical device around the optical axis and adjustment of the beam pitch between the image heights by shifting the second optical device and the third optical device in the sub-scanning direction (Z-direction) (see FIG. 5).

In the optical scanning apparatus according to the present invention, the second optical device and the third optical device have not only a function of the beam pitch adjustment but also a temperature compensation function for the overall optical system.

In general, in the case where a temperature around the LSU increases due to the influence of heat releasing of a polygon scanner or heat releasing of a fixing unit or the like, the focal length of the scanning lens is increased, and the beam waist position is also shifted toward the image plane, so that the beam spot diameter is increased and the one-dot reproducibility of an output image is deteriorated. In addition, the beam pitch is also changed to be widened. Against this backdrop, the second optical device is made of a resin material and the third optical device is made of a glass material, and thereby the negative refracting power is effected against the increase in temperature using differences in linear expansion coefficient and refractive index between the resin and the glass. As a result, the two optical devices can be caused to work in a direction for correcting an increase in the focal length of the overall optical system.

FIG. 12 shows linear expansion coefficients and data of temperature and wavelength dependencies of a refractive index with respect to a cyclic polyolefin resin and a glass material. In addition, FIG. 12 shows data of temperature dependency of an oscillation wavelength of the light source and data on aluminum that is a material used for the LSU housing.

In addition, FIG. 13 shows results obtained by simulating changes in optical characteristic values when the ambient temperature is changed by 25° C. in the case where a glass lens is used as the second optical device (absence of temperature correction) and the case where a resin lens is used as the same (presence of temperature correction), respectively.

By use of the resin lens, an optical system can be implemented, which is robust in changes in the main-scanning beam waist position, the sub-scanning beam waist position, and the beam pitch against the change in temperature. In other words, with respect to the second optical device, by configuring the anamorphic lens with a resin material, the initial adjustment of the main-scanning/sub-scanning beam waist and the beam pitch is available, and it is possible to improve robustness against change in the ambient temperature of the LSU.

In the optical scanning apparatus according to the present invention, in the case where a focal length of the first optical device, a composite focal length of the second optical device and the third optical device in the deflection scan perpendicular direction, a composite operating distance of the second optical device and the third optical device in the deflection scan perpendicular direction, and a lateral magnification ratio of the scanning optical system in the deflection scan perpendicular direction are denoted by fc, fcy, fcy_b, and βs, it is preferable that the following Equations (1) and (2) be satisfied.

$$fcy\_b/fcy \geq 1.07 \qquad (1)$$

$$1.5 \geq |\beta s \times fcy/fc| \geq 1.0 \qquad (2)$$

(Herein, fcy_b is an operating distance in the case where the second optical device and the third optical device are regarded as one optical device group).

Since the second optical device has a negative refracting power and the third optical device has a positive refracting power, so-called retrofocus type power arrangement is realized, so that the principal point position is allowed to be situated rearward. For this reason, if the relation expressed by Equation (1) is satisfied, it is possible to secure a short focal length and a long operating distance.

In addition, although there is a limitation to decreasing the interval between the light sources, it is preferable that a size of the total magnification ratio of the optical system in the sub-scanning direction, |βs×fcy/fc| is set to satisfy Equation (2). If |βs×fcy/fc| exceeds 1.5 as the upper limit, arrangement with a narrow interval between the light sources is required. Therefore, there are problems of deterioration of the optical system's lifetime caused by heat released from the light sources and occurrence of thermal or electrical crosstalk. On the other hand, if |βs×fcy/fc| exceeds 1.0 as the lower limit, then the focal lengths of the second optical device and the third optical device in the sub-scanning direction need to be set to be short or the lateral magnification ratio of the scanning lens needs to be designed to have a low level. If the lateral magnification ratio is made to be too low, curvature of the image plane is significantly deteriorated.

In the case where the focal lengths of the second optical device and the third optical device are set to be short, then the two optical devices need to be arranged in positions where the two optical devices are closer to the light polarizing unit. Referring to FIG. 1, in such an arrangement, the scanning lens L1 may easily physically interfere with the second optical device 13 and the third optical device 14, so that there is a problem in that the second optical device 13 and the third optical device 14 may reject the light flux which is deflected for the scanning by the light polarizing unit (polygon mirror). So, by satisfying the aforementioned Equation (1) simultaneously, it is possible to secure a short focal length and a long operating distance, and to implement optical arrangement which neither rejects the deflected light flux nor obstructs the layout.

Figure 3:
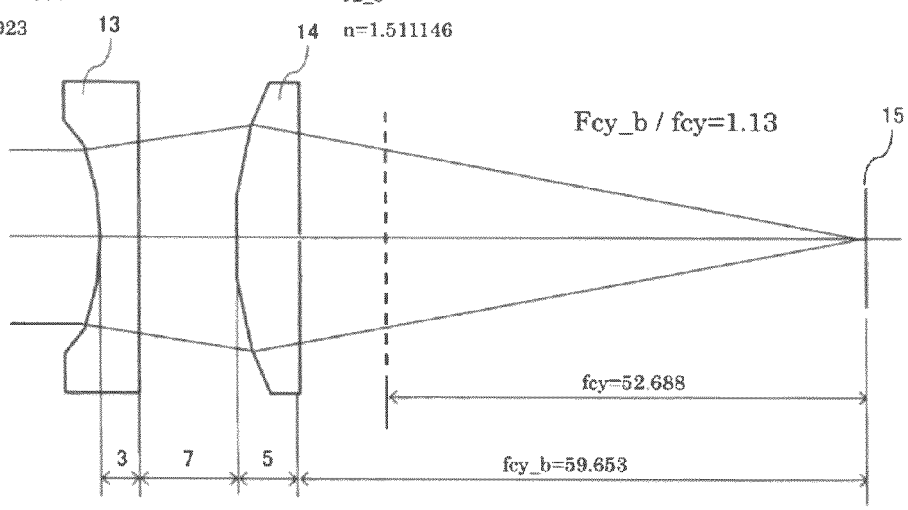
FIG. 3 is a diagram illustrating one example of a configuration of a second optical device and a third optical device in the optical scanning apparatus according to the present invention.
Figure 4A:
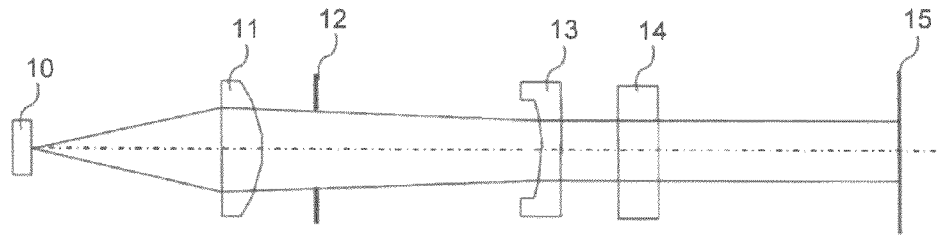
FIGS. 4A and 4B are diagrams illustrating a configuration and arrangement of a before-light-deflecting-unit optical system in the optical scanning apparatus according to the present invention.
Figure 4B:
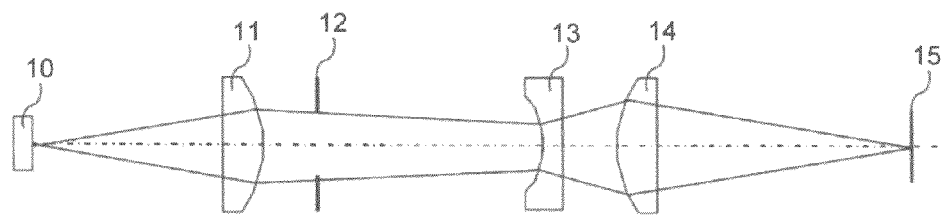

An example of specific numerical values is illustrated in FIG. 3.

$$fcy\_b = 59.635$$

$$fcy = 52.688$$

$$fcy\_b/fcy = 1.13$$

$$\beta s = 0.98$$

$$fc = 41.143$$

$$|\beta s \times fcy/fc| = 1.25$$

By the setting of the above-defined values, it is possible to obtain arrangement of optical devices which neither rejects the light deflected for the scanning nor obstructs the layout.

In addition, it is preferable that an incidence surface of the second optical device in the optical source side be a concave surface.

If the incidence surface is a planer surface, the reflected light may be easily returned to the light source and a light amount sensing monitor, so that problems may easily occur in that an oscillation state of the laser becomes unstable and the light amount sensing monitor becomes inaccurate. Then, the concave curved surface is situated on the incidence surface side, so that the returning light is strongly converged. As a result, the light is widened remarkably in a position of the light source, so that it is possible to restrain the oscillation state of the laser from being unstable due to the reflected returning light.

It is preferable that the light source 10 be a two-dimensional array light source where a plurality of rows of light emitting points, each of which has a plurality of light emitting points are one-dimensionally arrayed at predetermined intervals therebetween, are arranged at a predetermined interval. It is preferable that the two-dimensional array light source be a surface emitting laser array.

In the case of the two-dimensional array light source having light emitting points which are two-dimensionally arrayed, for example, a vertical cavity surface emitting laser array (VCSEL) light source, it is possible to suppress deterioration of a shape of an image forming spot on the scanned surface, increase in the image forming spot diameter, and increase in the deviation of the scanning line interval (deviation in beam pitch), which are caused by some arrangement error of the lens. In addition, it is possible to reduce adjustment items during an optical system assembling process and the number of assembling processes for the optical system.

Image Forming Apparatus

An image forming apparatus according to the present invention includes an image developing unit including: a photosensitive material; a charging unit which electrically charges a surface of the photosensitive material; an optical scanning unit which illuminates the surface of the photosensitive material charged by the charging unit with light to form an electrostatic latent image; and a developing device which attaches toner to the electrostatic latent image on the photosensitive material to form a toner image, a transferring unit which transfers the toner image formed on the photosensitive material onto a recording medium, and a fixing unit which fixes the toner image on the recording medium. The optical scanning apparatus according to the present invention is used as the optical scanning unit. The developing unit may take form of a plurality of developing units.

Figure 6:
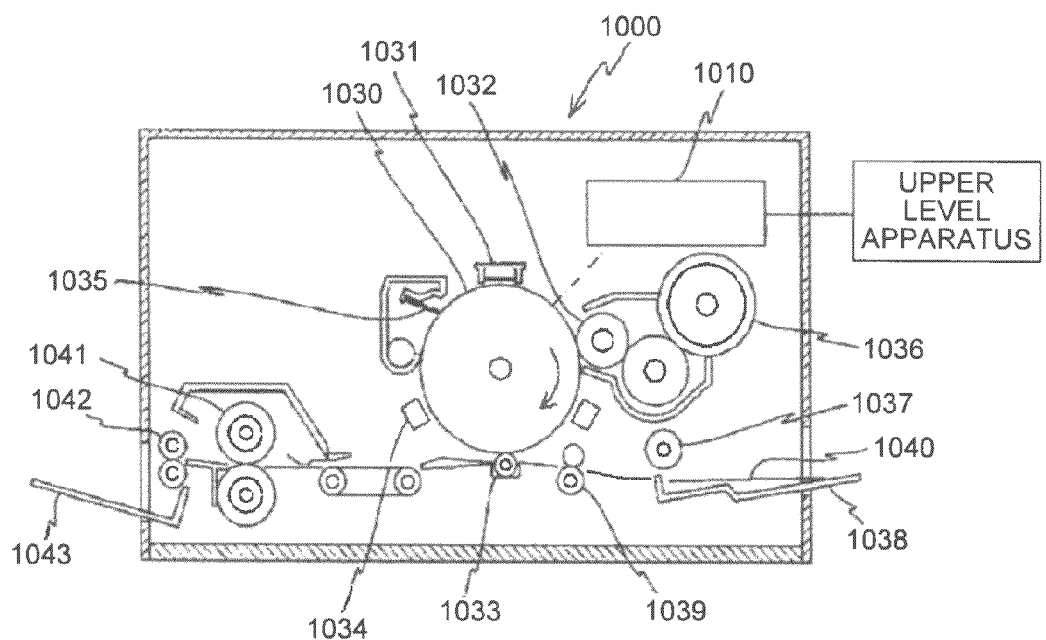
FIG. 6 is a schematic diagram illustrating an example of a configuration of an image forming apparatus where an optical scanning apparatus according to the present invention is mounted.

FIG. 6 illustrates a schematic configuration of a laser printer 1000 as an image forming apparatus including the optical scanning apparatus according to the present invention.

The laser printer 1000 includes an optical scanning apparatus 1010 according to the present invention, a photosensitive material drum 1030, an electric charger 1031, a developing roller 1032, a transfer charger 1033, a neutralizing unit 1034, a cleaning blade 1035, a toner cartridge 1036, a paper feeding roller 1037, a paper feed tray 1038, a registration roller pair 1039, a fixing roller 1041, a paper discharging roller 1042, a paper discharge tray 1043, and more.

A photosensitive layer is formed on a surface of the photosensitive material drum 1030 serving as the scanned surface. In other words, the surface of the photosensitive material drum 1030 is the scanned surface. Herein, the photosensitive material drum 1030 is configured to rotate in the arrow direction.

The electric charger 1031, the developing roller 1032, the transfer charger 1033, the neutralizing unit 1034, and the cleaning blade 1035 are disposed in the vicinity of the surface of the photosensitive material drum 1030. Then, in a rotational direction of the photosensitive material drum 1030, the electric charger 1031, the developing roller 1032, the transfer charger 1033, the neutralizing unit 1034, and the cleaning blade 1035 are disposed in this order.

The electric charger 1031 uniformly charges the surface of the photosensitive material drum 1030.

The optical scanning apparatus 1010 according to the present invention illuminates the surface of the photosensitive material drum 1030 charged by the electric charger 1031 with light which is modulated based on image information from an upper level apparatus (for example, PC or the like). Thereby, a latent image corresponding to the image information is formed on the surface of the photosensitive material drum 1030. The latent image formed herein is moved in a direction toward the developing roller 1032 according to rotation of the photosensitive material drum 1030.

The toner cartridge 1036 contains toner, and the toner is supplied to the developing roller 1032.

The developing roller 1032 attaches the toner supplied from the toner cartridge 1036 to the latent image formed on the surface of the photosensitive material drum 1030 to visualize the image information. Herein, the latent image (toner image) to which the toner is attached is moved in a direction toward the transfer charger 1033 according to the rotation of the photosensitive material drum 1030.

The paper feed tray 1038 contains recording paper sheets 1040. The paper feeding roller 1037 is disposed in the vicinity of the paper feed tray 1038. The paper feeding roller 1037 draws a recording paper sheet 1040 sheet by sheet from the paper feed tray 1038 and transports the recording sheet 1040 to the registration roller pair 1039. The registration roller pair 1039 temporarily holds the recording paper sheet 1040 drawn out by the paper feeding roller 1037 and transports the recording paper sheet 1040 toward a gap (interval) between the photosensitive material drum 1030 and the transfer charger 1033 in accordance with the rotation of the photosensitive material drum 1030.

A voltage having a polarity opposite to that of the toner is applied to the transfer charger 1033 so as to allow the toner on the surface of the photosensitive material drum 1030 to be electrically drawn to the recording paper sheet 1040. Due to the voltage, the toner image on the surface of the photosensitive material drum 1030 is transferred to the recording paper sheet 1040. The recording paper sheet 1040 transferred herein is transported to the fixing roller 1041.

In the fixing roller 1041, heat and pressure are applied to the recording paper sheet 1040, so that the toner is fixed on the recording paper sheet 1040. The recording paper sheet 1040 fixed herein is transported through the paper discharging roller 1042 to the paper discharge tray 1043 to be sequentially stacked on the discharge tray 1043.

The neutralizing unit 1034 electrically neutralizes the surface of the photosensitive material drum 1030.

The cleaning blade 1035 removes the toner (residual toner) remaining on the surface of the photosensitive material drum 1030. The surface of the photosensitive material drum 1030 where the residual toner has been removed is returned to a position in which the surface is opposed to the electric charger 1031.

Although the case of using the laser printer 1000 as the image forming apparatus illustrated in FIG. 6 is described, the image forming apparatus according to the present invention is not limited thereto. As long as an image forming apparatus includes the optical scanning apparatus 1010 according to the present invention, it is possible to form a high-resolution image at a high speed while suppressing the occurrence of the image density irregularity (banding).

For instance, an image forming apparatus may be used which includes the optical scanning apparatus 1010 according to the present invention and directly applies laser light to a medium (for example, paper) capable of color production by the laser light.

In addition, an image forming apparatus may be used in which a sliver halide film is used as an image carrier. In this case, a latent image is formed on the silver halide film through light scanning, and the latent image can be visualized by a process equivalent to a developing process in a commonly-used silver halide photographing process. Then, the image can be transferred to a printing paper sheet by a process equivalent to a printing process in a commonly-used silver halide photographing process. The image forming apparatus can be embodied as an optical plate making apparatus or an optical image rendering apparatus which renders a CT scanned image or the like.

In addition, even in an image forming apparatus for forming multicolor images, an optical scanning apparatuses corresponding to each color image is used, so that it is possible to form a high-resolution image at a high speed.

Figure 7:
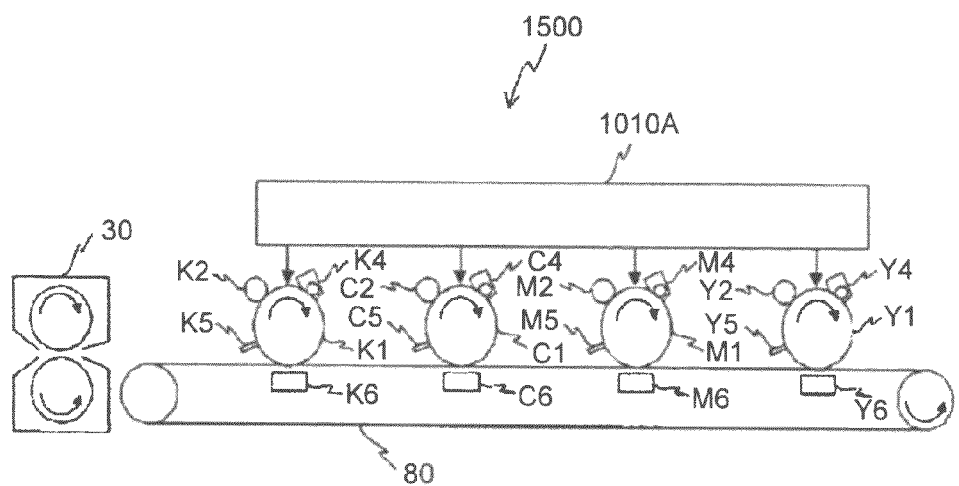
FIG. 7 is a schematic diagram illustrating an example of a configuration of a color image forming apparatus where a plurality of optical scanning apparatuses according to the present invention are mounted.

FIG. 7 illustrates an example of a tandem colorization apparatus 1500 including a plurality of photosensitive material drums corresponding to support color images.

As illustrated in FIG. 7, the tandem colorization apparatus 1500 includes, at least, a black (K)-purpose set of a photosensitive material drum K1, a charging unit K2, a developing unit K4, a cleaning unit K5 and a transfer-purpose charging unit K6; a cyan (C)-purpose set of a photosensitive material drum C1, a charging unit C2, a developing unit C4, a cleaning unit C5 and a transfer-purpose charging unit C6; a magenta (M)-purpose set of a photosensitive material drum M1, a charging unit M2, a developing unit M4, a cleaning unit M5 and a transfer-purpose charging unit M6; an yellow (Y)- purpose set of a photosensitive material drum Y1, a charging unit Y2, a developing unit Y4, a cleaning unit Y5 and a transfer-purpose charging unit Y6; an optical scanning apparatus 1010A according to the present invention; a transfer belt 80; and a fixing unit 30.

Figure 8:
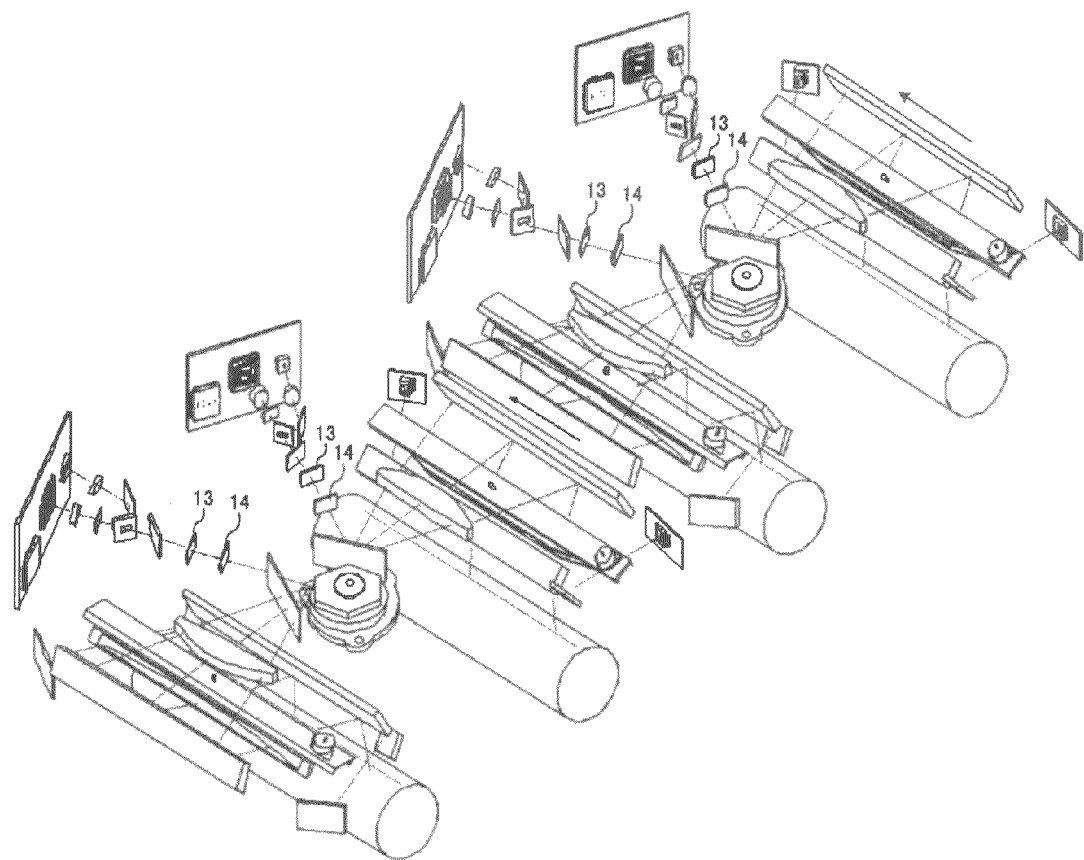
FIG. 8 is a schematic diagram illustrating an example of an overall configuration from a light source to a photosensitive drum in a color image forming apparatus where a plurality of optical scanning apparatuses according to the present invention are mounted.

FIG. 8 is a schematic diagram illustrating overall components from a VCSEL that is a light source for the optical scanning apparatus to a photosensitive material drum (an optical system housing is not illustrated).

The optical scanning apparatus illustrated in FIG. 8 includes four series of scanning optical systems having the same configuration as illustrated in FIG. 1, and distributive scanning is performed by commonly using each polygon mirror that is a light deflecting unit for two series.

As a light source, a VCSEL for black, a VCSEL for cyan, a VCSEL for magenta, and a VCSEL for yellow are included. In each VCSEL, a plurality of surface emitting lasers are two-dimensionally arrayed.

As illustrated in FIG. 7, the photosensitive material drum K1 serving as a scanned surface is illuminated with light from the VCSEL for black through the scanning optical system for black; the photosensitive material drum C1 is illuminated with light from the VCSEL for cyan through the scanning optical system for cyan; the photosensitive material drum M1 is illuminated with light from the VCSEL for magenta through the scanning optical system for magenta; and the photosensitive material drum Y1 is illuminated with light from the VCSEL for yellow through the scanning optical system for yellow.

The photosensitive material drums are rotated in their respective arrow directions, and the charger, the developing unit, the transfer charging unit, and the cleaning unit are disposed respectively in the rotational direction. Each of the chargers uniformly charges a surface of the corresponding photosensitive material drum. The surface of the photosensitive material drum charged by the charging unit is illuminated with light by the optical scanning apparatus 1010A according to the present invention, so that an electrostatic latent image is formed on the photosensitive material drum. Then, a toner image is formed on the surface of the photosensitive material drum by the corresponding developing unit. In addition, a toner image of each color is transferred to the recording paper sheet on the transfer belt 80 by the corresponding transfer-purpose charging unit. Finally, an image is fixed on the recording paper sheet by the fixing unit 30.

In the tandem colorization apparatus, color deviation may occur due to any manufacturing error or any positioning error of components, or the like, but the optical scanning apparatus 1010A includes a plurality of light emitting units which are two-dimensionally arrayed, so that it is possible to increase the accuracy of correction of the color deviation by selecting which light emitting unit is to be turned on.

As described above, in the optical scanning apparatus according to the present invention, the one-piece cylindrical lens used for a general LSU is used setting a refracting power of the second optical device to be negative and a refracting power of the third optical device to be positive, and the arrangement positions of the two optical devices are adjusted during the assembling process, so that it is possible to allow the scanning line interval (beam pitch) of the scanning lines formed on the scanned surface to be close to a desired value and it is possible to appropriately correct the beam spot diameter on the scanned surface. In this way, particularly, it is possible to suppress the occurrence of image density irregularity (banding) which is a problem in the multibeam system.

In addition, the second optical device is made of a resin material having a negative refracting power and the third optical device is made of a glass material having a positive refracting power, so that temperature compensation can be performed so as to reduce the change in the defocus position of the overall optical system and/or the scanning line interval against change in the ambient temperature, and the beam pitch adjustment function and the temperature compensation function can be integrated into the two optical devices.

According to the present invention, the following advantageous effects can be obtained. According to a first aspect of the invention, during a process of assembling the second optical device and the third optical device, the negative refracting power and the positive refracting power can be adjusted, so that it is possible to allow the scanning lines formed on the scanned surface by the light emitted from each of the light emitting points to approach a desired value of the beam pitch and to correct the beam spot diameter. In addition, the second optical device is made of a resin material and the third optical device is made of a glass material, so that it is possible to correct change in the focus position caused by change in the ambient temperature of the LSU (Laser Scanning Unit). In other words, the beam pitch adjustment function and the temperature correction function can be integrated into two optical devices.

According to a second aspect of the invention, in the optical scanning apparatus provided in the first aspect, so-called retrofocus type power arrangement is realized, so that the principal point position can be retroceded. So, it is possible to obtain excellent layout characteristic capable of securing a short focal length and a long operating distance and to set a lateral magnification ratio of the overall optical system to be the optimum.

According to a third aspect of the invention, in the optical scanning apparatus provided in the first or second aspect, the returning light is strongly converged, so that it is possible to prevent the oscillation state of the laser from being unstable due to the reflected returning light.

According to a fourth aspect of the invention, in the optical scanning apparatus provided in any one of the first to third aspects, it is possible to suppress deterioration of the shape of the image forming spot on the scanned surface, increase in the image forming spot diameter, increase in the scanning line interval error, and an increase in the scanning line interval deviation between the scanning positions, which are caused by the arrangement error of the lens and to reduce adjustment items during the optical system assembling process and reduce the number of the optical system assembling processes.

According to a fifth aspect of the invention, in the optical scanning apparatus disclosed in the fourth aspect, it is possible to suppress deterioration of the shape of the image forming spot on the scanned surface, increase in the image forming spot diameter, increase in the scanning line interval error, and an increase in the scanning line interval deviation between the scanning positions, which are caused by the arrangement error of the lens and to reduce adjustment items during the optical system assembling process and reduce the number of the optical system assembling processes.

According to a sixth aspect of the invention, it is possible to form an image having a high image quality.

According to a seventh aspect of the invention, in the formation of a color image, color deviation among colors can be reduced, so that it is possible to achieve a high image quality.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus comprising:
a light source that has a plurality of light emitting points;
a light deflecting unit that deflects a plurality of light fluxes emitted from the light source for scanning;
a before-light-deflecting-unit optical system that shapes the plurality of light fluxes emitted from the light source to form a linear image which is elongated in a deflection scanning direction at an approximate position of a deflecting surface of the light deflecting unit; and
a scanning optical system that forms an image on a scanned surface from the light fluxes deflected for the scanning in the deflecting surface of the light deflecting unit,
wherein the before-light-deflecting-unit optical system includes:
a first optical device which shapes the plurality of light fluxes emitted from the light source;
a second optical device made of a resin material which has an anamorphic negative refracting power in a deflection scanning direction and a deflection scan perpendicular direction and has a larger refracting power in the deflection scan perpendicular direction than a refracting power in the deflection scanning direction; and
a third optical device made of a glass material which has substantially no refracting power in the deflection scanning direction and a positive refracting power in the deflection scan perpendicular direction, the optical devices being disposed in this order from the light source side, and
a focal length of the first optical device, a composite focal length of the second optical device and the third optical device in the deflection scan perpendicular direction, and a lateral magnification ratio of the scanning optical system in the deflection scan perpendicular direction are denoted by fc, fcy, and βs, respectively, and
the following Equation (1) is satisfied:

$$1.5 \geq |\beta s \times fcy/fc| \geq 1.0 \qquad (1).$$

2. The optical scanning apparatus according to claim 1, wherein the following Equation (2) is satisfied, where a lateral magnification ratio of the scanning optical system in the deflection scan perpendicular direction is denoted by fcy_b:

$$fcy\_b/fcy \geq 1.07 \qquad (2)$$

(herein, fcy_b is an operating distance in the case where the second optical device and the third optical device are regarded as one optical device group).

3. The optical scanning apparatus according to claim 1, wherein an incidence surface of the second optical device on the light source side is a concave surface with respect to both of the deflection scanning direction and the deflection scan perpendicular direction.

4. The optical scanning apparatus according to claim 1, wherein the light source is a two-dimensional array light source having a plurality of rows of light emitting points one-dimensionally arrayed at a predetermined interval, in which the rows are arranged at a predetermined interval.

5. The optical scanning apparatus according to claim 4, wherein the two-dimensional array light source is a surface emitting laser array.

6. An image forming apparatus comprising:
a developing unit including a photosensitive material, a charging unit that electrically charges a surface of the photosensitive material, an optical scanning unit that illuminates the surface of the photosensitive material charged by the charging unit with light to form an electrostatic latent image, and a developing device that attaches toner to the electrostatic latent image on the photosensitive material to form a toner image;
a transferring unit that transfers the toner image formed on the photosensitive material onto a recording medium; and
a fixing unit that fixes the toner image on the recording medium,
wherein the optical scanning apparatus according to claim 1 is provided as the optical scanning unit.

7. An image forming apparatus comprising:
a plurality of developing units each including a photosensitive material, a charging unit that electrically charges a surface of the photosensitive material, an optical scanning unit that illuminates the surface of the photosensitive material charged by the charging unit with light to form an electrostatic latent image, and a developing device that attaches toner to the electrostatic latent image on the photosensitive material to form a toner image;
a transferring unit that transfers the toner image formed on the photosensitive material onto a recording medium; and
a fixing unit that fixes the toner image on the recording medium,
wherein the optical scanning apparatus according to claim 1 is provided as the optical scanning unit.

8. The optical scanning apparatus according to claim 1, wherein each of the second optical device and the third optical device is configured to be displaced in an optical axis direction of the before-light-deflecting-unit optical system.

9. The optical scanning apparatus according to claim 3, wherein an incidence surface of the third optical device on the light source side is a convex surface.

10. The optical scanning apparatus according to claim 1, wherein incidence surfaces of the send and third optical devices are curved surfaces on the light source side.

11. The optical scanning apparatus according to claim 1, wherein:
a displacement of the second optical device in the optical axis direction changes a beam waist position in a main-scanning direction and a beam waist position in a sub-scanning direction; and
a displacement of the third optical device in the optical axis direction changes the beam waist position in the sub-scanning direction and does not change the beam waist position in the main-scanning direction.

12. An adjustment method for an image forming apparatus comprising:
a plurality of developing units each including a photosensitive material, a charging unit that electrically charges a surface of the photosensitive material, an optical scanning unit that illuminates the surface of the photosensitive material charged by the charging unit with light to form an electrostatic latent image, and a developing device that attaches toner to the electrostatic latent image on the photosensitive material to form a toner image;
a transferring unit that transfers the toner image formed on the photosensitive material onto a recording medium; and
a fixing unit that fixes the toner image on the recording medium,
the optical scanning unit including:
a light source that has a plurality of light emitting points;

a light deflecting unit that deflects a plurality of light fluxes emitted from the light source for scanning;

a before-light-deflecting-unit optical system that shapes the plurality of light fluxes emitted from the light source to form a linear image which is elongated in a deflection scanning direction at an approximate position of a deflecting surface of the light deflecting unit; and a scanning optical system that forms an image on a scanned surface from the light fluxes deflected for the scanning in the deflecting surface of the light deflecting unit, wherein the before-light-deflecting-unit optical system includes:

a first optical device which shapes the plurality of light fluxes emitted from the light source;

a second optical device made of a resin material which has an anamorphic negative refracting power in a deflection scanning direction and a deflection scan perpendicular direction and has a larger refracting power in the deflection scan perpendicular direction than a refracting power in the deflection scanning direction; and a third optical device made of a glass material which has substantially no refracting power in the deflection scanning direction and a positive refracting power in the deflection scan perpendicular direction, the optical devices being disposed in this order from the light source side, and a focal length of the first optical device, a composite focal length of the second optical device and the third optical device in the deflection scan perpendicular direction, and a lateral magnification ratio of the scanning optical system in the deflection scan perpendicular direction are denoted by fc, fcy, and βss, respectively, and the following Equation (1) is satisfied:

$$1.5 \geq |\beta ss \times fcy/fc| \geq 1.0 \qquad (1),$$

the method comprising:

adjusting an interval of scanning lines formed on the scanned surface by displacement of the second optical device and the third optical device in an optical axis direction of the before-light-deflecting-unit optical system.

\* \* \* \* \*